Dec. 6, 1966

G. E. GORKER 3,290,221

BOILING WATER NUCLEAR REACTOR WITH BUOYANT
FUEL OR REFLECTOR CONTROL ASSEMBLY

Filed Sept. 15, 1965

INVENTOR.
George E. Gorker
BY
ATTORNEY.

INVENTOR.
George E. Gorker
BY
ATTORNEY.

United States Patent Office 3,290,221
Patented Dec. 6, 1966

3,290,221
BOILING WATER NUCLEAR REACTOR WITH
BUOYANT FUEL OR REFLECTOR CONTROL
ASSEMBLY
George E. Gorker, Cincinnati, Ohio, assignor to the
United States of America as represented by the United
States Atomic Energy Commission
Filed Sept. 15, 1965, Ser. No. 487,643
6 Claims. (Cl. 176—28)

The invention described herein was made in the course of, or under a contract with the U.S. Atomic Energy Commission. It relates generally to neutronic reactors and more particularly to direct-cycle boiling water neutronic reactor systems which utilize floating assemblies to automatically adjust their power output in response to system load fluctuations.

Characteristic of most neutronic reactor systems has been the use of externally actuated neutron absorbers to effect changes in reactivity for power control, startup, and shutdown. Nuclear sensors and instrumentation are required to provide suitable data for manually or automatically adjusting the neutron absorbers so as to effect the desired reactivity changes.

The control problem is often amplified in those boiling water reactors which generate superheated steam, by the requirement that the evaporator-superheater interface remain in the design location. This requirement arises because the evaporator is designed for high power density with water and wet steam cooling while the superheater is a gas cooled region designed for low power density. A water flow which is too large for a given power level will force water and wet steam into the superheater and thereby will cause a large increase in reactivity therein. On the other hand, if the flow is insufficient, dry steam will be produced in the evaporator and will cause overheating therein in addition to the development of excessive temperature gradients.

One inherent advantage of direct-cycle boiling water reactor systems is their relatively high thermodynamic efficiencies resulting from the elimination of any intermediate heat exchangers as are found in both dual cycle boiling water and pressurized water reactor systems. This advantage has been offset, however, by the inability heretofore of direct-cycle boiling water reactors to follow load or turbine demand. Decreases in reactor pressure due to increased turbine demand have resulted in increases in the steam void fraction in the reactor core with a corresponding decrease in reactivity, although an increase in reactivity is required to meet the increased demand. An ability to follow turbine load is most desirable in a power producing reactor and is considered a basic advantage in reactors having this characteristic.

All power reactors must have considerable excess (or built in) reactivity during startup so as to enable their continuous and extended operation. During reactor operations, the excess reactivity compensates for burnup of fissionable material and the buildup of neutron absorbing fission and radioactive decay products. Because this excess reactivity, if uncontrolled, would cause the reactor to become supercritical with a resultant rapid increase in power beyond its design limitations, various means of compensating for or holding down the excess reactivity must be provided. A typical method of compensating for the excess reactivity is to provide neutron absorbent material within or adjacent to the reactor core in the form of rods, drums, or in solution with the coolant; and then withdrawing it slowly as the excess reactivity decreases through the mechanisms described above. Placing neutron absorbing materials in the core region is wasteful, however, in that neutrons absorbed therein are nonproductive.

It is, accordingly, a general object of this invention to provide a load following, direct-cycle, boiling water neutronic reactor.

Another object of the invention is to provide a direct-cycle boiling water neutronic reactor which is self-regulating.

Another object of the invention is to provide a neutronic reactor in which a substantial margin of excess reactivity can be provided without resort to compensating neutron absorbents.

Another object of the invention is to provide a boiling water neutronic reactor containing a neutronic superheater wherein the evaporator-superheater interface is inherently stable.

Other objects of the invention will become apparent from an examination of the following description of the invention and the appended drawings, wherein.

In accordance with the present invention, a class of boiling water neutronic reactors is provided where at least one reactor component or assembly floats in the reactor coolant, and wherein the system reactivity is increased with upward movement of the floating component.

Figure 2:
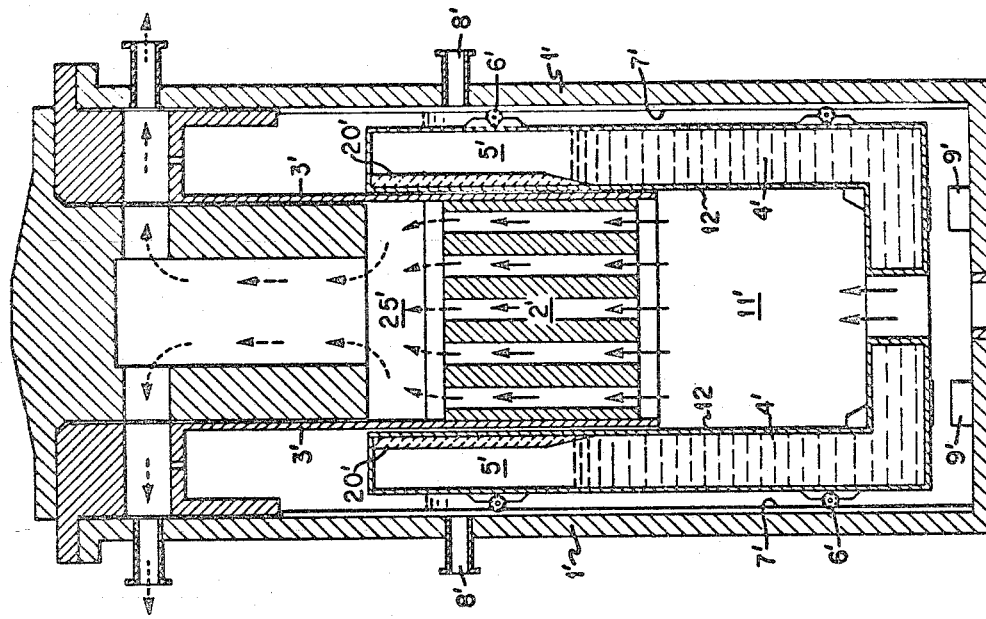
FIG. 2 is a vertical sectional view of a boiling water reactor incorporating a floating heavy water neutron reflector in accordance with this invention.
Figure 1:
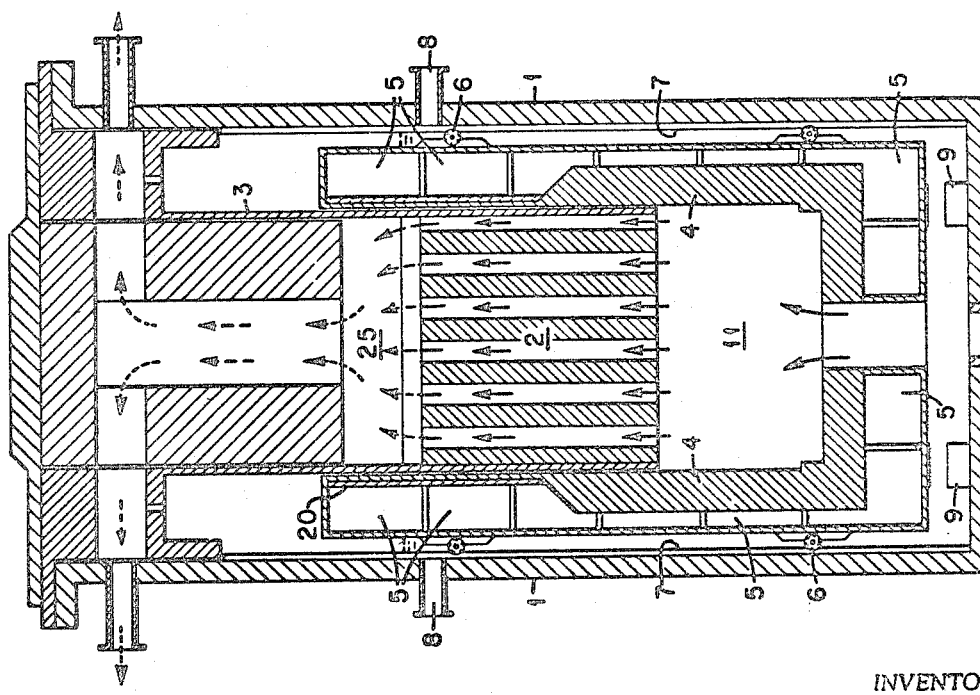
FIG. 1 is a vertical sectional view of a boiling water reactor incorporating a floating beryllium neutron reflector in accordance with this invention.

In order to facilitate an understanding of the invention, reference is first made to FIGS. 1 and 2 wherein boiling water reactor systems incorporating floating reflectors are illustrated. Similar reference numerals are used to denote similar reactor components in these two figures as well as in FIG. 3. A containment vessel 1 contains a central active core region 2 supported in a fixed cylindrical shroud 3. A floating neutron reflector 4, shown close to its lowermost position, is mounted concentrically with and below active core region 2. Gas float compartments 5 are fixed to and support reflector 4 which is shown in the form of a solid such as beryllium or beryllium oxide in FIG. 1 and as a liquid such as heavy water in FIG. 2. Neutron reflecting materials should be light to reduce the void space necessary to float the reflector. Beryllium with a density less than 1.9 is a good solid reflector material and heavy water is a good liquid reflector material. The entire reflector and float assembly is restricted to vertical movement only so as to maintain its symmetric relationship with core region 2, by rollers 6 which ride on vertical rails 7.

To shut down these reactors it is necessary to increase the amount of neutrons being lost from the core and cause it to become subcritical. This can be achieved by opening safety dump valve ports 8 so as to lower the level of the coolant water which floats the reflector. When the coolant water has been lowered sufficiently, the reflector 4 will come to rest on stops 9 and the non-reflecting gas compartments and neutron absorbent material in concentric cylinder 20 will surround the active core region. The neutron loss from the core region through the gas compartments and to cylinder 20 is sufficient to prevent the reactor from maintaining criticality. The water itself serves as a damper to gently stop the downward motion of the reflector assembly. After the reactor is shut down, the afterheat is removed by a small flow of feedwater which is maintained at a level just above the reactor core.

The reactors of FIGS. 1 and 2 are brought from a shutdown condition to criticality by closing safety dump valve ports 8 and admitting feedwater through inlet ports 10. During the initial startup the feedwater is admitted gradually and fills the lower part of containment vessel 1 as well as the reactor inlet plenum 11 immediately below the active core region 2. As the feedwater rises, the reflector begins to float upward until the reactor becomes critical. The float chambers, reflector, and core are designed so that criticality is initially reached after the core has been completely submerged in feedwater. The feedwater continues to rise slowly until the boiling rate in the core just equals the feedwater flow rate, at which point equilibrium is established; and the reactor power is exactly matched by the turbine demand as evidenced by the feedwater flow.

To increase power, it is only necessary to increase feedwater flow which will tend to move the reflector upwards until the steam boil-off rate is again equal to the feedwater flow. Upward movement of the reflector results in a power increase as more escaping neutrons are then returned by the reflector to the reactor core where they cause fissions. If the reflector is raised too high due to a sudden increase in the feedwater flow rate, the reactor power will rise to a level where the steam generation rate exceeds the feedwater flow rate. The feedwater level will then be lowered until the reflector falls to an equilibrium position, and the boil-off rate equals the feedwater flow rate. Thus it is seen that the floating reflector 4 acts to automatically adjust the reactor power level to match the demand indicated by the feedwater flow rate.

The floating reflector 4' of FIG. 2 is filled with heavy water which has a very low neutron absorption cross section and a large neutron scattering cross section. Since the density of heavy water is only slightly greater than the light water coolant, only a small void volume 5' is necessary to float the reflector. Another advantage of this reflector is that the heavy water will have nearly the same vapor pressure as the light water coolant so that a minimum pressure differential will exist across the reflector containment vessel 12.

Figure 3:
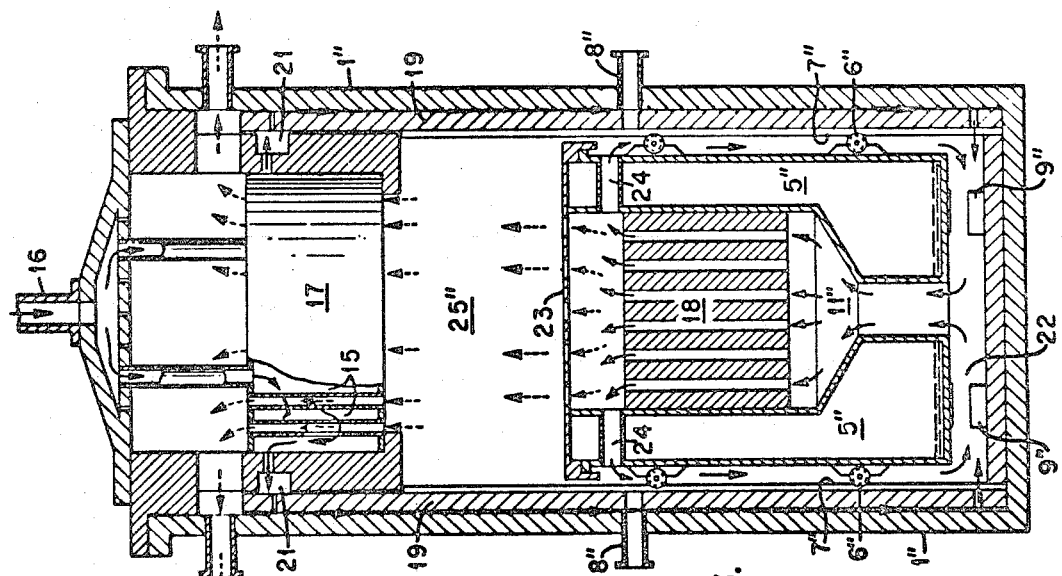
FIG. 3 is a vertical sectional view of a boiling water reactor incorporating a floating evaporator in accordance with this invention.

A reactor having a fixed nuclear superheater 17 and a floating nuclear evaporator 18 is illustrated in FIG. 3. Both the superheater 17 and evaporator 18 are nuclear fueled assemblies which are subcritical when sufficiently separated. A hollow, stationary, coupling cylinder 19 surrounds the superheater and evaporator. Coupling cylinder 19 is fabricated of a neutron reflecting material such as clad thorium hydride which has a moderate neutron capture cross section and is useful in creating $U^{233}$, a fissionable isotope of uranium. Cylinder 19 increases the reactivity coupling between the superheater and evaporator so that criticality occurs while there is still a substantial separation between the two assemblies. The evaporator 18 contains a gas or steam-filled gas compartment 5'' which floats it when feedwater fills containment vessel 1'' to a sufficient depth. The evaporator and float chamber are designed to float when the water level reaches a level above the top of evaporator 18. Once boiling begins, the steam voids generated within evaporator 18 also contribute to its buoyancy.

In the arrangement of FIG. 3 feedwater enters inlet port 16 and fills the moderator cavity 15 of the superheater 17. This water can remove the heat generated in the superheater at low power levels such as during startup before steam is generated in the evaporator. After the moderator cavity is filled, the water overflows into an annular plenum 21 and then down between coupling cylinder 19 and containment vessel 1''. It then enters the lower part of the containment vessel in region 22, filling the evaporator and its surrounding space until it begins to float upward. Rollers 6'' and vertical rails 7'' restrict lateral motion by the evaporator while permitting it to move vertically as the water level changes. Feedwater flow during the startup period is increased at a limited rate so as to prevent the reactor from becoming highly supercritical while at very low power before the reactor has become self-regulating. Eventually the reactor becomes slightly supercritical and the power rises until the boiling in the evaporator matches the feedwater flow and the reactor is exactly critical at the proper power level.

Increasing the feedwater flow will increase power by floating the evporator 18 closer to the superheater 17 and causing the evaporator-superheater assembly to become supercritical. The reactor will go through a series of diminishing power oscillations and finally reach equlibrium at the power level dictated by the feedwater flow rate. Gradual changes in feedwater flow rate will minimize the number and amplitude of the power oscillations.

A steam separator baffle plate 23 for removing entrained water from the upwardly flowing steam is located above evaporator 18. The water circulates through evaporator 18 by free convection with the unevaporated water flowing through return ports 24 and then downward between the evaporator and coupling cylinder 19. Steam separates from the water and rises through steam separator baffle 23 into saturated steam plenum 25'' between the evaporator and superheater. The flow schemes of both the steam and circulating water are shown by arrows in FIG. 3, as in the other figures, with broken arrows designating steam flow and solid arrows designating water flow. In order to shut down the reactor, dump valve ports 8'' which are located at the sides of the reactor, are opened and the water level lowered so as to separate the evaporator and superheater sufficiently to cause the reactor to become subcritical. Water continues to flow through the superheater and evaporator and out the dump valve ports after the reactor is shut down in order to remove reactor afterheat.

By separating the superheater and evaporator regions of the reactor, each assembly can be designed to operate near its optimum performance. The evaporator is a floating, self-regulating assembly when operated in spaced-apart relationship to a fixed nuclear superheater. It can be designed to contain a major portion of the fissionable fuel contained in the reactor and to use low temperature, low absorption cross section structural and fuel cladding materials; while the superheater is designed with a smaller portion of the fissionable fuel and to use high temperature materials which have a somewhat higher absorption cross section than those in the evaporator. The resulting power distribution is greatest in the evaporator where its latent heat of vaporization is supplied to the boiling water.

Figure 4:
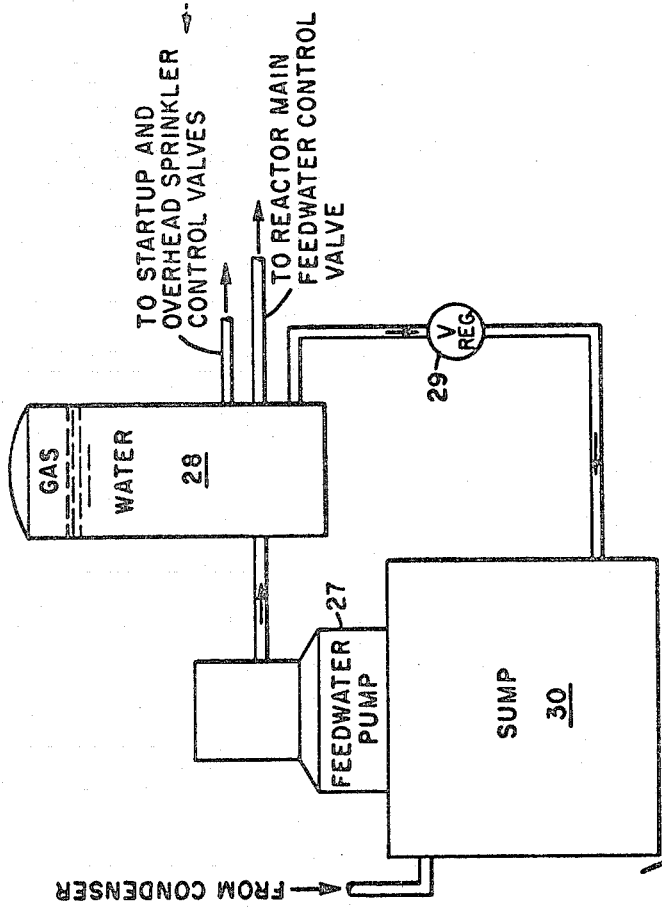
FIG. 4 is a schematic diagram of a feedwater supply system suitable for use with reactors made in accordance with this invention.

FIG. 4 schematically illustrates a feedwater supply system designed especially for use with the herein-described boiling water reactor systems. A feedwater pump 27 supplies a surge tank 28 of limited volume. A by-pass valve 29 connects the output of the surge tank to the feedwater pump sump 30. By-pass valve 29 is controlled by a pressure regulator (not shown) and returns feedwater from the surge tank to the feedwater pump sump when the surge tank pressure exceeds the regulator set point. The feedwater pump can operate against a dead head if necessary as would occur if the reactor steam valves were closed off during operation, for example. Steam pressure would build up in the reactor until the feedwater pressure would exceed the set point of the pressure regulator, at which point the by-pass valve 29 would open and prevent further flow to the reactor.

The surge tank 28 ensures a feedwater flow rate to the reactor which varies in proportion to the steam load at the turbine. Increases in the steam load at the turbine decrease reactor pressure and cause an increase in feedwater flow from surge tank 28 which is maintained at essentially constant pressure. As has been pointed out in reference to FIGS. 1–3, an increase in feedwater flow acts to insert reactivity into the reactor systems discussed herein, causing an increase in the reactor power sufficient to boil the increased feedwater flow.

As a safety feature, feedwater flow can be limited to a value which the reactor can safely boil away. In addition, a mechanical, variable "stop" (not shown) may be provided to the floating component which would limit upward movement and prevent an excess reactivity insertion at any time. The "stop" position would be varied over the reactor lifetime to compensate for reactivity losses due to burnup of fissionable fuel and fission product buildup.

The above embodiments of boiling water reactor systems, which use floating assemblies to automatically adjust their power, are highly schematic and are not intended to represent final designs. The sizes and spacing of neutron reflectors, cores, control rods, and other associated equipment are not shown in exact proportions, nor are they shown in detail. It will be recognized by those skilled in the neutronic reactor art, however, that virtually any fuel element configuration which could be used in other well-known boiling water reactors already in existnce will suffice here. Also, the exact detailed configuration of such things as control rods and reflectors is not necessary for a proper understanding of the invention.

What is claimed is:

1. In a boiling water neutronic reactor comprising a containment vessel, fuel and reflector assemblies disposed within said containment vessel, and water entering said containment vessel and passing through said fuel assembly where it is transformed into steam; the improved control system wherein at least part of one of said assemblies is buoyant in water so as to effect a change in its vertical position with changes in the water level in said containment vessel, said change in vertical position of said assembly causing a change in the reactivity of said reactor, and means for varying the flow rate of water entering said containment vessel in proportion to changes in steam load demand on the reactor.

2. The improved control system of claim 1 wherein at least part of said reflector assembly is buoyant.

3. The improved control system of claim 1 wherein at least part of said fuel assembly is buoyant.

4. The improved control system of claim 1 wherein said means for varying the flow rate of water entering said containment vessel comprises; a surge tank communicating with said containment vessel and supplying water under high pressure thereto, a pump sump for receiving water under low pressure from the turbine condenser, and a feedwater pump for transferring water from said low pressure pump sump to said high pressure surge tank.

5. In a boiling water neutronic reactor comprising a containment vessel, fuel and reflector assemblies disposed within said containment vessel, and water entering said containment vessel and passing through said fuel assembly where it is transformed into steam; the improved control scheme wherein excess fissionable material is initially disposed within said fuel assembly enabling it to reach criticality while substantially unreflected, said reflector assembly being buoyant in water and movable vertically so as to effect a change in its vertical position with changes in the water level in said containment vessel, said reflector being disposed substantially below said fuel assembly initially and gradually moving upward around said fuel assembly to increase the reflection of neutrons leaving said fuel assembly as the excess fissionable material contained therein decreases, and means for varying the flow rate of water entering said containment vessel in proportion to changes in steam load demand on the reactor.

6. In a boiling water neutronic reactor comprising a containment vessel, a fuel assembly comprising upper and lower fuel regions and a reflector assembly disposed within said containment vessel, water entering said containment vessel and passing through said fuel assembly where it is transformed into steam; the improved control scheme wherein excess fissionable material is initially disposed within said fuel assembly enabling it to reach criticality while said upper and lower fuel regions are spaced apart vertically, said upper fuel assembly being fixed, said lower fuel assembly being buoyant in water and movable vertically so as to effect a change in its vertical position with changes in the water level in said containment vessel, said lower fuel region gradually moving upward toward said upper fuel region to maintain criticality as the excess fissionable material contained in the fuel assembly decreases during reactor operation, and means for varying the flow rate of water entering said containment vessel in proportion to changes in steam load demand on the reactor.

References Cited by the Examiner

UNITED STATES PATENTS

| 3,068,161 | 12/1962 | Cawley | 176—21 |
| 3,124,514 | 3/1964 | Koutz et al. | 176—55 |
| 3,180,799 | 4/1965 | Blake | 176—21 |

FOREIGN PATENTS 941,919  11/1963  Great Britain.

L. DEWAYNE RUTLEDGE, *Primary Examiner.*

H. E. BEHREND, *Assistant Examiner.*